Dec. 28, 1926.

G. H. THOMAS

SHAFT COUPLING

Filed Dec. 21, 1925

Inventor.
George H. Thomas
By H. H. Stimson
atty.

Dec. 28, 1926.
G. H. THOMAS
SHAFT COUPLING
Filed Dec. 21, 1925
1,612,399
2 Sheets-Sheet 2
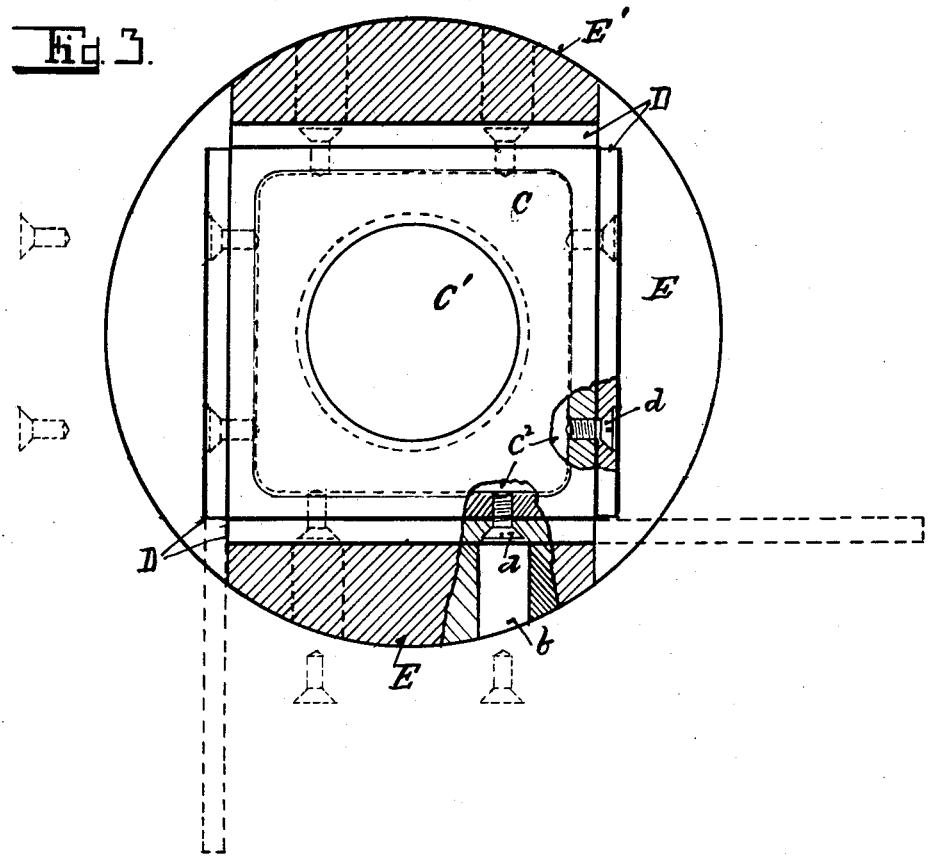
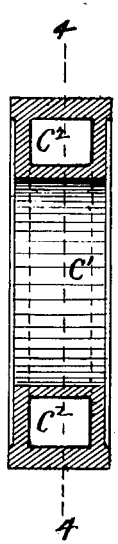
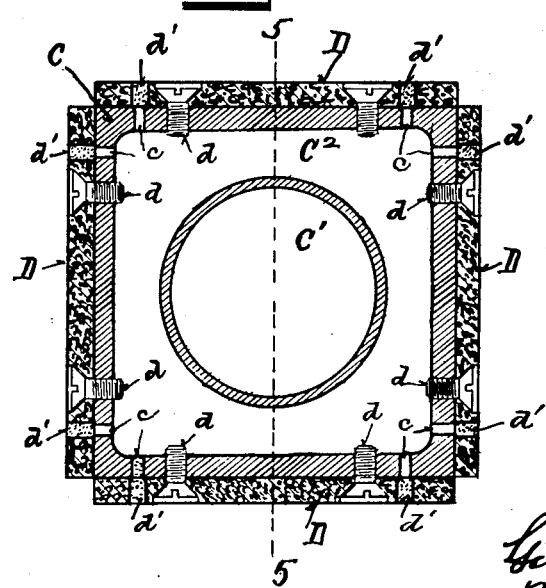

Patented Dec. 28, 1926.

1,612,399

UNITED STATES PATENT OFFICE.

GEORGE H. THOMAS, OF WESTFIELD, NEW YORK, ASSIGNOR TO AMERICAN STERILIZER COMPANY, OF ERIE, PENNSYLVANIA.

SHAFT COUPLING.

Application filed December 21, 1925. Serial No. 76,800.

This invention relates to shaft couplings, and particularly to such couplings for shafts which are liable to get out of alignment.

Heretofore when shafts have had to be coupled, it has been necessary to move one or both of the shafts to be coupled longitudinally apart, and then insert the complete coupling between the ends of the shafts, and then secure the coupling on one of the shafts, and move the shafts toward each other, inserting the other shaft into the opposite end of the coupling.

The object of this invention is to make a coupling, consisting of duplicate end members, so that the shafts to be coupled can be moved apart transversely out of alignment, so that each end member of the coupling can be secured upon the adjacent ends of said shafts and the intermediate coupling member placed in one of said coupling end members and the shafts, and coupling end members moved transversely back into alignment, said coupling members being adapted to pass each other, and co-engage when brought into alignment.

Another object of this invention is to provide means to lubricate the parts of the coupling, in such a manner that the lubricant will be caused to flow to the parts to be lubricated.

Another object of this invention is to provide means for renewing worn parts, without removing the coupling members from the coupled shafts.

These and other features of this invention are hereinafter described and pointed out, and are illustrated in the accompanying drawings in which:

Figure 3 is a transverse section of my improved shaft coupling, on the line 3 in Fig. 1.

Figure 4 is a transverse section of the intermediate member of my improved shaft coupling on the line 4—4 in Fig. 5.

Figure 5 is a transverse section of the same on the line 5—5 in Fig. 4.

Figure 1:
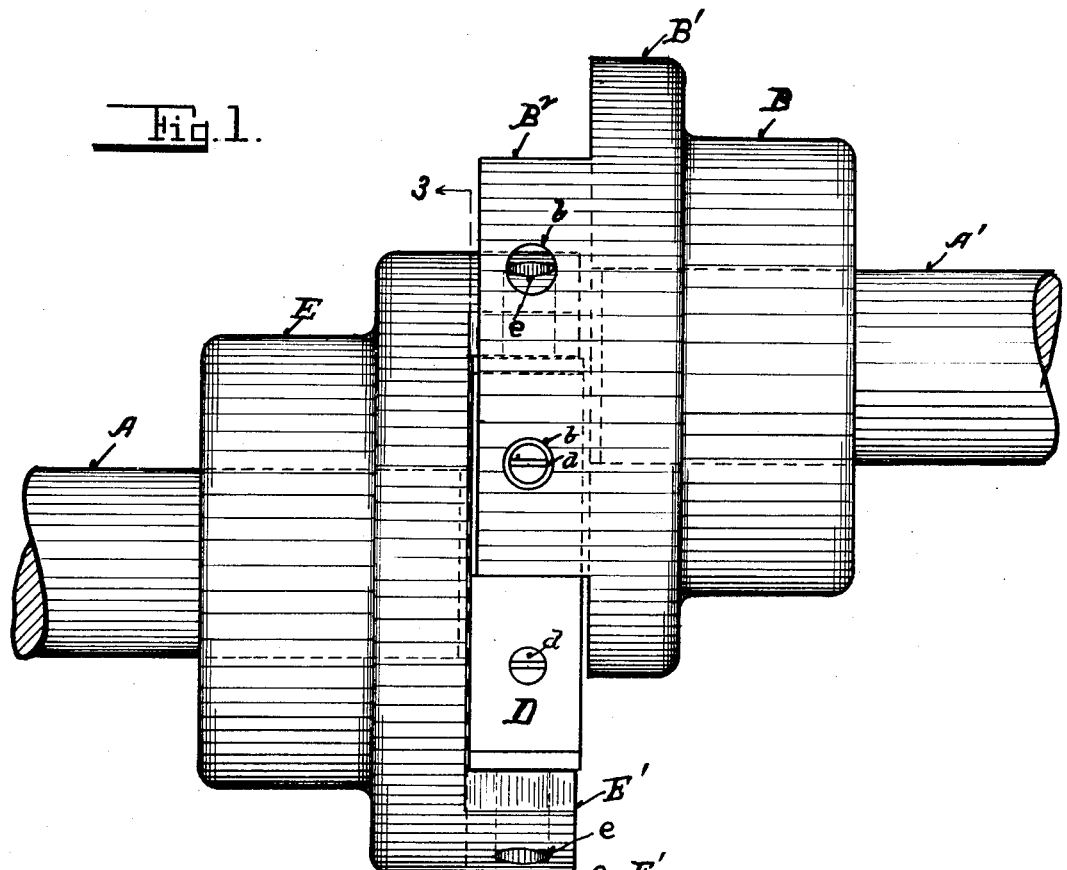
Figure 1 is a side elevation of a shaft coupling according to my invention in process of being placed in position upon shafts to be coupled.
Figure 2:
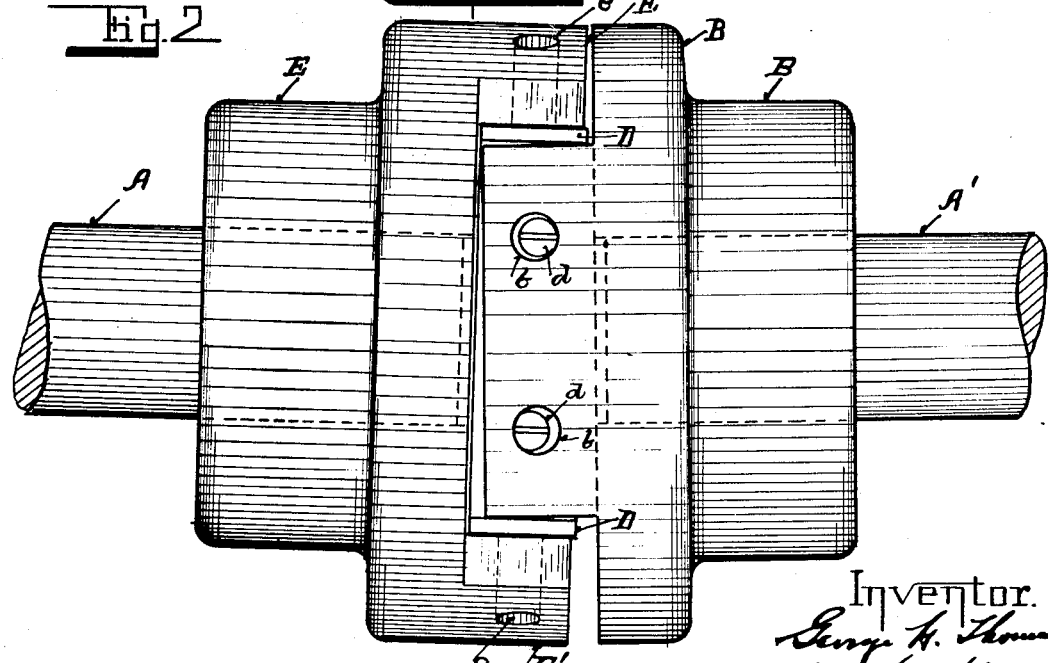
Figure 2 is a like view of a shaft coupling, according to my invention, in position on coupled shafts, which are at an angle to each other.

In these drawings A indicates the power shaft, and A' indicates the driven shaft, see Figs. 1 and 2. When installing this coupling one of the shafts, preferably the driven shaft A', is raised out of alignment, and one of the duplicate end members is placed thereupon. These duplicate end members consist of a hub portion B having a disc B'. The disc B' is provided with shoulders $B^2$, diametrically opposite each other, and between the shoulders $B^2$ on the disc B' is placed a square member C, see Fig. 3, which is provided with a central opening C'. This square member C is preferably provided with a cavity $C^2$, adapted to contain oil or other lubricant, and is provided with holes $c$ to permit the outflow of the lubricant placed in the cavity $C^2$.

Secured on the faces of the square member C, are friction plates D by means of screws $d$. The plates D are provided with holes coincident with the holes $c$ in the square member C, in which are placed wicks $d'$, see Fig. 4, of felt or other suitable material adapted to control the passage of lubricant therethrough.

Upon the power shaft A is placed a duplicate member E the shoulders E' of which will pass between the shoulders $B^2$ on the opposite duplicate member, so that when the shafts A and A' are in place the shoulders $B^2$ and E' embrace the four sides of the square intermediate member C, of the coupling.

The shoulders $B^2$ and E' are provided with openings $b$ and $e$, through which the screws $d$ may be removed, to permit the removal of the friction plates D as shown by broken lines in Fig. 3, without removing the coupling members B and E.

Having thus fully shown and described my invention so that others can utilize the same, what I claim as new and desire to secure by Letters Patent is:

1. In a device of the class described, a power shaft, a driven shaft, a hub on each of said shafts, a pair of spaced shoulders on each of said hubs adapted to pass sidewise between the shoulders on the opposite hub, a square block between said hubs and engaged by said shoulders and a removable plate on each of the four sides of said block.

2. In a device of the class described, a power shaft, a driven shaft, a hub on each of said shafts, a pair of spaced shoulders on each of said hubs adapted to pass sidewise between the shoulders on the opposite hub, a square hollow block between said hubs adapted to contain lubricant and engaged by said shoulders, and a removable friction plate on each of the four sides of said block.

In testimony whereof I affix my signature.

GEORGE H. THOMAS.